United States Patent [19]

Jennings, Jr.

[11] Patent Number: 4,951,751

[45] Date of Patent: Aug. 28, 1990

[54] DIVERTING TECHNIQUE TO STAGE FRACTURING TREATMENTS IN HORIZONTAL WELLBORES

[75] Inventor: Alfred R. Jennings, Jr., Plano, Tex.

[73] Assignee: Mobil Oil Corporation, New York, N.Y.

[21] Appl. No.: 379,757

[22] Filed: Jul. 14, 1989

[51] Int. Cl.$^5$ .............................................. E21B 43/00
[52] U.S. Cl. .................................... 166/285; 166/271; 166/274; 166/270; 166/279; 166/291; 166/294; 166/300
[58] Field of Search .................... 166/281, 295, 305.1, 166/306, 308, 274, 271, 269, 285, 279, 270, 291, 294, 300

[56] References Cited

U.S. PATENT DOCUMENTS

| | | | |
|---|---|---|---|
| 4,067,389 | 1/1978 | Savins | 166/246 |
| 4,153,118 | 5/1979 | Hart | 175/4.51 |
| 4,265,311 | 5/1981 | Ely | 166/271 |
| 4,333,461 | 6/1982 | Muller | 128/284 |
| 4,378,845 | 4/1983 | Medlin et al. | 166/297 |
| 4,722,397 | 2/1988 | Sydansk | 166/295 |
| 4,759,579 | 7/1988 | Swenson | 294/19.1 |
| 4,817,719 | 4/1989 | Jennings, Jr. | 166/292 |
| 4,819,726 | 4/1989 | Beirute et al. | 166/291 |

Primary Examiner—Jerome W. Massie, IV
Assistant Examiner—R. J. Schoeppel
Attorney, Agent, or Firm—Alexander J. McKillop; Charles J. Speciale; Charles A. Malone

[57] ABSTRACT

A method for staging a fracturing treatment in a horizontal wellbore where solidified gel is used as a diverting medium. A desired section of the horizontal wellbore farthest removed from the angle of deviation from vertical of the wellbore is perforated. Via perforations contained in the horizontal section, the desired interval is fractured hydraulically. The gel is displaced with a "wiper plug" and the gel confined to the fractured interval and wellbore area adjacent the fractured interval. Here the gel forms a solid gel in the interval and a gel plug in the wellbore. Afterwards, another section of the horizontal well is perforated. Thereafter, a second desired interval is fractured. After completion of the fracturing process, the gel plug breaks and the "wiper plug" is pumped to the farthest end of the horizontal wellbore.

5 Claims, 2 Drawing Sheets

4,951,751

DIVERTING TECHNIQUE TO STAGE FRACTURING TREATMENTS IN HORIZONTAL WELLBORES

FIELD OF THE INVENTION

This invention relates to a method of fracturing subterranean formations surrounding oil wells, gas wells, and similar formations which contain a horizontal wellbore. In one aspect, the invention relates to a method which utilizes staged hydraulic fracturing in combination with a solidified gel and a wiper plug of a desired density for assisting in the fracturing of intervals along a horizontal wellbore.

BACKGROUND OF THE INVENTION

Hydraulic fracturing is a well stimulation technique designed to increase the productivity of a well by creating highly conductive fractures or channels in a producing formation surrounding the well. The process normally involves two basic steps: (1) injecting a fluid at sufficient rate and pressure to rupture the formation, thereby creating a crack (fracture) in the reservoir rock; and (2) thereafter placing a particulate material (propping agent) in the formation to maintain the fracture wall open by resisting forces tending to close the fracture. If stimulation is to occur, the propping agent must have sufficient mechanical strength to bear the closure stresses and provide relatively high permeability in the propped fracture.

With advances in drilling technology, it is currently possible to drill horizontal wellbores deep into hydrocarbon-producing reservoirs. Utilization of horizontal wellbores allows extended contact with a producing formation, thereby facilitating drainage and production of the reservoir. In order to enhance the production from a reservoir, it is often necessary to hydraulically fracture the reservoir through which the horizontal wellbore has penetrated.

Although horizontal wellbores allow more contact with the producing formation, some difficulties are encountered when horizontal wellbores are utilized which are not commonly experienced when vertical wells are used. Methods utilized in producing hydrocarbons from a formation or reservoir via vertical wells often prove to be inefficient when attempting to remove hydrocarbons from a reservoir where horizontal wellbores are used. This inefficiency results in utilization of increased amounts of fluids used during enhanced oil recovery operations. This results in a diminution in the amount of hydrocarbons removed from the formation or reservoir.

In order to obtain additional production from a formation penetrated by a horizontal wellbore, it is often necessary to fracture different intervals of the formation and prop the fracture with a proppant. To this end, a method for more effectively selecting the interval of the formation to be fractured along a horizontal wellbore would be beneficial.

Therefore, what is needed is a method for the selective fracturing of a formation along a horizontal wellbore which can decrease production shut-down time.

SUMMARY OF THE INVENTION

This invention is directed to a method for the staged fracturing of a formation containing a horizontal wellbore. In the practice of this invention, a horizontal wellbore is perforated at the end furthest from the angle of deviation from vertical of the wellbore so as to allow fluid communication with a desired interval of a formation. Once the desired perforations have been placed into the furthest end of the wellbore, a hydraulic fracturing operation is conducted through said perforations so as to fracture the desired interval of the formation. Thereafter, a solidifiable gel containing a gel breaker is injected into the wellbore where the perforations are made. Afterwards, a wiper plug is injected into the formation thereby displacing the gel to an area adjacent to the fractured interval. The solidifiable gel is allowed to form a solid gel in the formation adjacent to the perforations and a solid gel plug in the wellbore.

After the desired number of perforations have been placed into the wellbore so as to allow fluid communication with another interval of the formation closer to the angle of deviation from vertical and adjacent to said first interval, hydraulic fracturing is initiated so as to fracture a second desired interval of a formation. If it is desired to fracture another interval of the formation even closer to the angle of deviation from vertical of the wellbore, a slug of solidifiable gel containing a gel breaker can be injected into the wellbore. Afterwards, as is mentioned above, a wiper plug can then be injected into the formation so as to displace the gel in the wellbore to an area adjacent to said second interval. The gel is allowed to form a solid gel in the fractured interval and also form a solid gel plug in the wellbore.

The steps of performing, fracturing a desired interval of the formation, injecting a solidifiable gel, placing a wiper plug into the wellbore, and allowing a solid gel to form can be repeated until the formation has been fractured to the extent desired along the horizontal wellbore. Once the desired number of intervals have been fractured, the gel breaker causes the solid gel in the formation and the gel plug to liquefy. Once liquefication has occurred, injection pressure is applied to the wellbore so as to cause the wiper plug(s) to be pumped to the farthest end of the horizontal section of the wellbore and out of the perforated area of the wellbore. After the wiper plug(s) have been pumped to the furthest end of the wellbore so as not to restrict flow through the perforations, the production of hydrocarbonaceous fluids is resumed.

It is therefore an object of this invention to increase the permeability of a formation penetrated by a horizontal wellbore by fracturing an interval farthest from the angle of deviation from vertical of the wellbore and thereafter progressively fracturing additional intervals of the formation closer to the angle of deviation from vertical of said wellbore.

It is another object of this invention to use a solid gel plug to preclude fluid entry into a horizontal wellbore from a previously fractured interval of a formation while conducting another fracturing operation in an interval of the wellbore which is closer to the angle of deviation from vertical of said wellbore.

It is still another object of this invention to use wiper plugs to remove liquefied gel from the wellbore after the desired intervals have been fractured in the formation.

It is yet another object of this invention to provide an economical and cost-effective method for controlling the production of hydrocarbonaceous fluids from a formation containing a horizontal wellbore by increasing the permeability of a formation along said wellbore.

It is a still yet further object of this invention to obtain effective stimulation by hydraulic fracturing through a horizontal wellbore so the desired intervals of a formation can be effectively treated by selectively perforating said wellbore and using a solid gel to prevent fracturing fluid entry into the previously fractured interval while conducting a fracturing operation into an interval closer to the angle of deviation from vertical of the wellbore.

DESCRIPTION OF THE PREFERRED EMBODIMENTS

Figure 1:
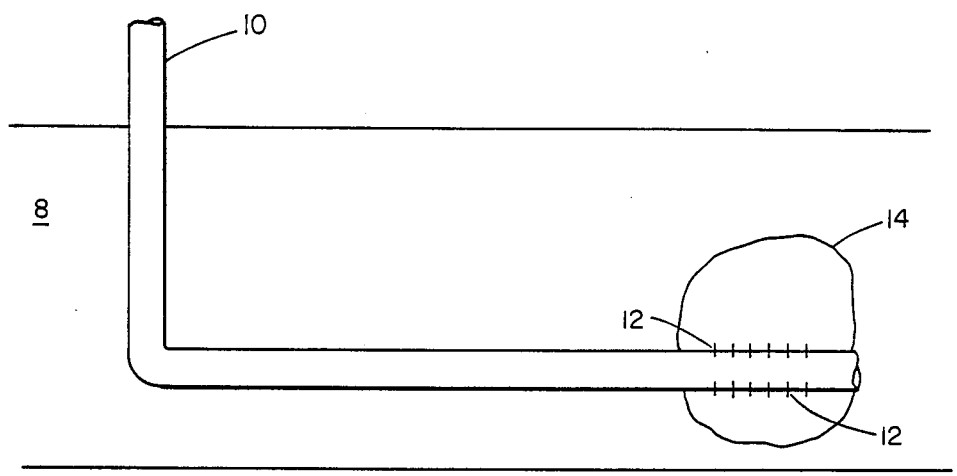
FIG. 1 is a schematic representation of a horizontal wellbore which shows an initially fractured zone.

In the practice of this invention referring to FIG. 1, a horizontal wellbore 10 is shown penetrating formation 8. Said wellbore can be cased or uncased. Horizontal wellbore 10 has provided therein perforations 12 which communicate with formation 8. These perforations are made in horizontal wellbore 12 at a distance which is farthest from the angle of deviation from vertical which the wellbore makes in the formation. The perforations are placed at this distance so as to enable fluid communication with the most distant interval of the formation desired to be fractured. Perforations 12 can be made in horizontal wellbore 10 by any type of perforating gun. It is preferred to use those perforation guns such as a jet gun that can provide the roundest and most burr-free perforations when perforating a cased well. Any number of mechanical or magnetic-type decentralized perforating guns can be utilized for perforating along the horizontal casing. The magnetic-type perforating gun uses magnets to orient the perforating gun at the top of the casing. One type of casing gun which can be used herein is disclosed in U.S. Pat. No. 4,153,118. This patent is hereby incorporated by reference herein. As will be obvious to one skilled in the art, other types of perforating guns which can be suitably oriented may also be used in the practice of the method of the present invention. The number of perforations placed into horizontal wellbore 10 will vary depending upon formation conditions and the productive capacity of the formation.

Once the desired number of perforations 12 have been placed into wellbore 10, pressure testing of the pumping and well equipment is commenced. Following the pressure testing, a viscous fluid frequently referred to as "pad" is injected into the well at a rate and pressure sufficient to initiate and propagate a fracture into formation 8. The earth stresses are such that the fracture normally is along a vertical plane radiating outwardly from wellbore 8. A hydraulic fracturing technique which can be used herein is discussed in U.S. Pat. No. 4,067,389, which issued to Savins on Jan. 10, 1978. Another method for initiating hydraulic fracturing is disclosed by Medlin et al. in U.S. Pat. No. 4,378,845, which issued on Apr. 5, 1983. These patents are hereby incorporated by reference.

Figure 2:
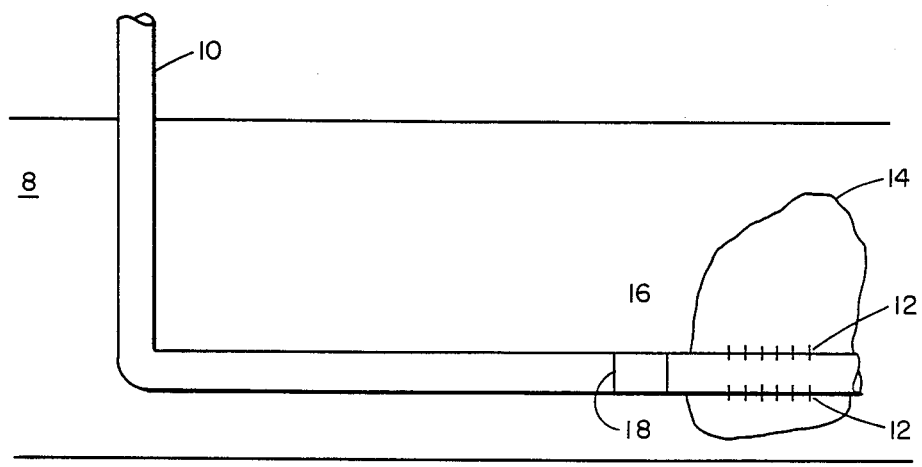
FIG. 2 is a graphical representation of a horizontal wellbore which shows the gel plug and wiper plug in place subsequent to the initial zone being fractured.
Figure 3:
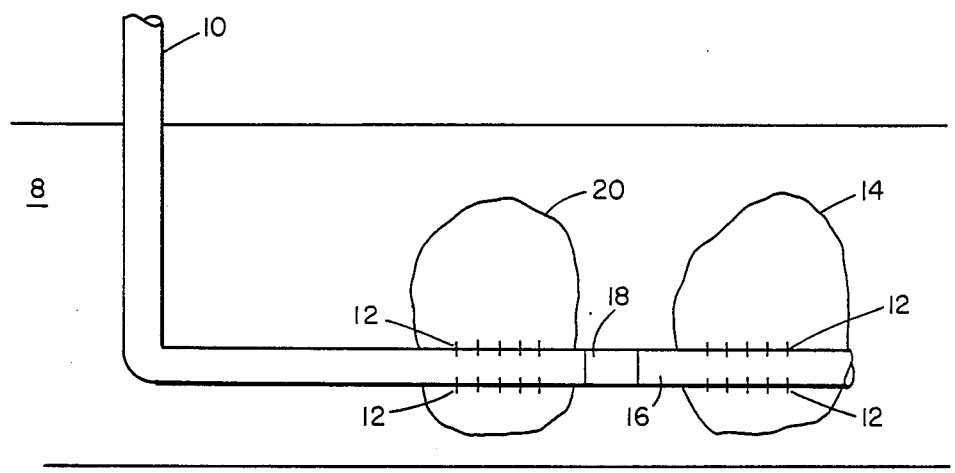
FIG. 3 depicts graphically a horizontal wellbore with a second fractured interval.
Figure 4:
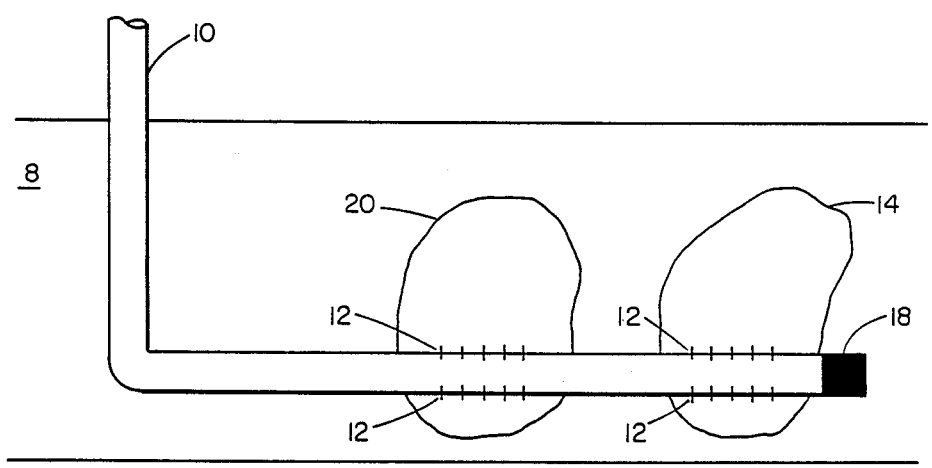
FIG. 4 is a schematic representation of a horizontal wellbore showing the wiper plug pumped to the end of the wellbore.

Once the fracture has been created to the desired extent in the interval furthest away from the angle of deviation from the vertical portion of wellbore 10, hydraulic fracturing pressure is released. Thereafter, a solidifiable gel containing a gel breaker is injected into wellbore 10 where it enters the initially fractured interval 14 by perforations 12, as shown in FIG. 1. A "wiper plug" or "pipeline pig" is used to displace solidifiable gel into the fractured interval and into the wellbore area adjacent to the perforations where said gel is confined. As is shown in FIG. 2, the solidifiable gel is allowed to form a solid gel plug 16 in wellbore 10 and also to form a solid gel in the initially fractured interval 14.

One method of making a suitable, pumpable, solidifiable gel mixture is discussed in U.S. Pat. No. 4,333,461, that issued to Muller on June 8, 1982, and which is hereby incorporated by reference herein. The stability and rigidity of gel plug 16 will depend upon the physical and chemical characteristics of said gel plug. As is known to those skilled in the art, gel plug 16 should be of a stability and rigidity which will withstand the pumping forces applied thereto and to environmental well conditions.

Other gel mixtures can be used to obtain a desired stability and rigidity. A preferred mixture used to obtain the desired stability and rigidity, for example, is a mixture of hydropropyl guar cross-linked with transitional metals and ions thereof. The purpose of the transitional metal ions is to provide increased strength, stability and rigidity for gel plug 16. The composition of said hydropropyl guar mixture is disclosed in U.S. Pat. No. 4,817,719, that issued to A. R. Jennings on Apr. 4, 1989 and which is incorporated herein by reference. Chemicals suitable for use as gel breakers are also incorporated into the solidifiable gel mixture. These chemicals include enzymes and other oxidizing agents (such as sodium persulfate) which are suitable for breaking down the solid gel. These chemical compositions are also discussed in U.S. Pat. No. 4,817,719. Other gel breakers sufficient for use for this purpose are discussed in U.S. Pat. No. 4,265,311 which issued to Ely on May 5, 1981. These patents are hereby incorporated by reference herein.

With the gel plug 16 in place and the gel having formed a solid in the initially fractured interval 14 so as to preclude fluid entry from formation 8 into wellbore 10, the wiper plug or pipeline pig makes contact with gel plug 16. A pipeline pig is a device which is caused to flow in a pipeline or a conduit as an aid for removing undesired deposits which form on the inside surfaces of a pipe or conduit. Pigs take the form of spheriod plugs or torpedo-type configurations which have diameters slightly smaller than the inner diameter of said pipeline or conduit. Pipeline pigs may be constructed of a variety of materials such as resilient foam, rubber or metal such as stainless steel or aluminum. A pipeline pig is disclosed in U.S. Pat. No. 4,759,579 that issued to Swenson on July 26, 1988. This patent is hereby incorporated by reference herein. A wiper plug and use therefore is disclosed in U.S. Pat. No. 4,819,726 that issued to Beirute et al. on Apr. 11, 1989. This patent is hereby incorporated by reference herein.

Having the pipeline pig 18 properly positioned in wellbore 10, perforations are made in wellbore 10 as is mentioned above. Once the desired perforations 12 have been placed into a section of wellbore 10 so as to communicate with another interval of the formation closer to the angle of deviation from the vertical portion of wellbore 10, hydraulic fracturing pressure is once again applied. This hydraulic fracturing pressure causes a fracture to be created in an interval of formation 8 which is adjacent to the initially fractured interval 14 but closer to the angle of deviation of the vertical portion of wellbore 10. Fracturing pressure is applied to the formation until the second interval is fractured to the extent desired so as to create a second fractured interval 20 in formation 8. After the elapse of a sufficient amount of time, the gel breaker contained in the solidified gel causes said gel to liquefy. The liquefied gel subsequently flows from formation 8 into wellbore 10. If only two intervals of the formation are desired to be fractured along wellbore 10, a fluid is injected into wellbore 10 and pig 18 is used to force the gel from the wellbore. The pressure is applied until such time as the wiper plug or pig has been removed from the wellbore area of initially fractured interval 14.

Should it be desired to fracture additional intervals along wellbore 10, instead of injecting a fracturing fluid to force pig 18 further down wellbore 10, another slug of solidifiable gel can be placed into wellbore 10. As was done previously, the gel would be displaced by said pig and allowed to form subsequently a solid gel in the second fractured interval 20 and a gel plug in wellbore 10 adjacent thereto. The second wiper plug or pipeline pig 18 would then be positioned adjacent to the second gel plug 16. Perforations could then be made in a third section of wellbore 10 so as to fluidly communicate with another interval of the formation closer to the angle of deviation from vertical of wellbore 10. Subsequently, hydraulic fracturing pressure could be applied through wellbore 10 so as to create fractures in a third interval of formation 8. The steps of placing additional solidifiable gel, another wiper plug into wellbore 10, and creating additional perforations and fractures could be repeated until all desired intervals have been fractured. Afterwards, the wiper plug or pipeline pig 18 could be used to force any liquefied gel material to the furthest end of wellbore 10. Any remaining liquefied gel would flow from the intervals into wellbore 10. Afterwards, the production of hydrocarbonaceous fluids would continue.

Although the present invention has been described with preferred embodiments, it is to be understood that modifications and variations may be resorted to without departing from the spirit and scope of this invention, as those skilled in the art will readily understand.

What is claimed is:

1. A method for fracturing a formation containing a horizontal wellbore comprising:
   (a) perforating a horizontal wellbore at a desired first interval at a distance farthest from an angle of deviation from vertical of the wellbore thereby causing the wellbore to be in fluid communication with the formation;
   (b) fracturing hydraulically said formation at said first interval;
   (c) injecting a solidifiable gel containing a gel breaker into said wellbore which enters the first interval;
   (d) displacing with a wiper plug said solidifiable gel so as to force the solidifiable gel into said first interval and contain said gel in the wellbore in an area adjacent to said perforations;
   (e) allowing said solidifiable gel to remain in said formation and in said wellbore for a time sufficient to form a solid gel in said first interval and a solid gel plug in said wellbore which precludes fluid entry into the wellbore adjacent said first interval;
   (f) while said solid gel plug remains in said wellbore, perforating another section of said wellbore so as to cause fluid communication between a second interval of said formation and said wellbore; and
   (g) fracturing hydraulically said formation through perforations so as to cause a second interval to be in fluid communication with said wellbore.

2. The method as recited in claim 1 where said wellbore is cased.

3. The method as recited in claim 1 where the solidifiable gel comprises hydropropyl guar gum.

4. The method as recited in claim 1 where after each said perforating preceding step (f), steps (c), (d) and (e) are repeated, thereby fracturing additional intervals in said formation.

5. The method as recited in claim 1 where said gel breaker liquefies said solid gel which flows back into the wellbore, the wiper plug gets pumped out of the area of said first interval, and hydrocarbonaceous fluids are produced from said formation.

* * * * *